United States Patent

Sato

[11] Patent Number: 5,210,852
[45] Date of Patent: May 11, 1993

[54] MEMORY CONTROL SYSTEM FOR CONTROLLING A FIRST AND SECOND PROCESSING MEANS TO INDIVIDUALLY ACCESS A PLURALITY OF MEMORY BLOCKS

[75] Inventor: Tetsuya Sato, Tokyo, Japan

[73] Assignee: Casio Computer Co., Ltd., Tokyo, Japan

[21] Appl. No.: 602,097

[22] Filed: Oct. 23, 1990

[30] Foreign Application Priority Data

Nov. 1, 1989 [JP] Japan .................................. 1-285658

[51] Int. Cl.⁵ ............................................... G06F 13/00
[52] U.S. Cl. ........................... 395/425; 364/DIG. 1; 364/243.6; 364/246.1; 364/254.3; 364/926.92
[58] Field of Search ............... 395/400, 425; 364/200 MS File, 900 MS File

[56] References Cited

U.S. PATENT DOCUMENTS

| | | | |
|---|---|---|---|
| 3,955,180 | 5/1976 | Hirtle | 395/500 |
| 4,495,569 | 1/1985 | Kagawa | 395/725 |
| 4,636,974 | 1/1987 | Griffin | 395/425 |
| 4,805,094 | 2/1989 | Oye et al. | 395/250 |
| 4,818,932 | 4/1989 | Odenheimer | 340/798 |
| 4,837,688 | 6/1989 | Cronauer et al. | 395/650 |
| 4,855,903 | 8/1989 | Carleton et al. | 395/325 |
| 4,967,392 | 10/1990 | Werner et al. | 395/275 |

FOREIGN PATENT DOCUMENTS 0259050 3/1988 European Pat. Off. .
0261751 3/1988 European Pat. Off. .

Primary Examiner—Joseph L. Dixon
Assistant Examiner—Frank J. Asta
Attorney, Agent, or Firm—Frishauf, Holtz, Goodman & Woodward

[57] ABSTRACT

First processing means designates a plurality of individually accessible memory blocks of memory means in a predetermined order and performs processing thereon block by block. Second processing means sequentially process those blocks, block by block, which have already been processed by the first processing means.

4 Claims, 8 Drawing Sheets

MEMORY CONTROL SYSTEM FOR CONTROLLING A FIRST AND SECOND PROCESSING MEANS TO INDIVIDUALLY ACCESS A PLURALITY OF MEMORY BLOCKS

BACKGROUND OF THE INVENTION

1. Field of the Invention

The present invention relates to a memory control system with a memory unit comprising a plurality of memory blocks which are individually accessible.

2. Description of the Related Art

Conventionally, a data processing apparatus is realized which has a CPU 10 (first processing means) and a DMA controller 20 (second processing means) as shown in FIG. 9 so that data is directly transferred between a
magnetic disk 40 and a RAM 30b under the control of the DMA controller 20, without involving the CPU 10, and during the data transfer, the CPU 10 executes another processing, e.g., processing of data in a RAM 30a, thereby increasing the data processing speed.

In other words, according to this data processing apparatus, the CPU 10 needs only to specify, to the DMA controller 20, data to be transferred, and read/write access to the RAM 30b or the like, and execution of a program by the CPU 10 and the data transfer by the DMA controller 20 are performed in parallel. A disk controller 50 shown in FIG. 9 executes access control to the magnetic disk 40 under the control of the DMA controller 20.

In a case where a specified file on the magnetic disk 40 is developed on the RAM 30b and record update is performed in the RAM 30b in the conventional apparatus, however, the CPU 10 cannot perform the record update in the RAM 30b until all the records of the specified file on the magnetic disk 40 are completely developed in the RAM 30b.

This is because, like in the case of a file search, all the records of the specified file are considered as subjects of the process to be performed by the CPU 10. There are however many cases where data update is performed directly on read records without requiring reading of every record into the RAM 30b. One such case may be, for example, where a predetermined value is sequentially added to the numerical data of predetermined items of every record.

SUMMARY OF THE INVENTION

It is therefore an object of the present invention to permit second processing means to access a memory unit even while first processing means is continuously accessing that memory unit.

To achieve this object, according to the present invention, there is provided a memory control system with memory means including a plurality of individually accessible memory blocks, comprising: first and second processing means separately operable; first access means for sequentially accessing the memory blocks in a predetermined order under the control of the first processing means; and second access means for sequentially accessing the memory blocks whose accessing by the first access means is completed, under the control of the second processing means.

According to this invention, therefore, the first and second processing means can perform accessing and processing with respect to the memory unit in parallel, realizing fast processing.

Since the second processing means processes each memory block under the condition that processing of this block by the first processing means is completed, it is possible to prevent the second processing means from processing those memory blocks whose processing by the first processing means has not been completed yet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

The first preferred embodiment of the present invention will now be described referring to FIGS. 1 through FIG. 4.

Figure 1:
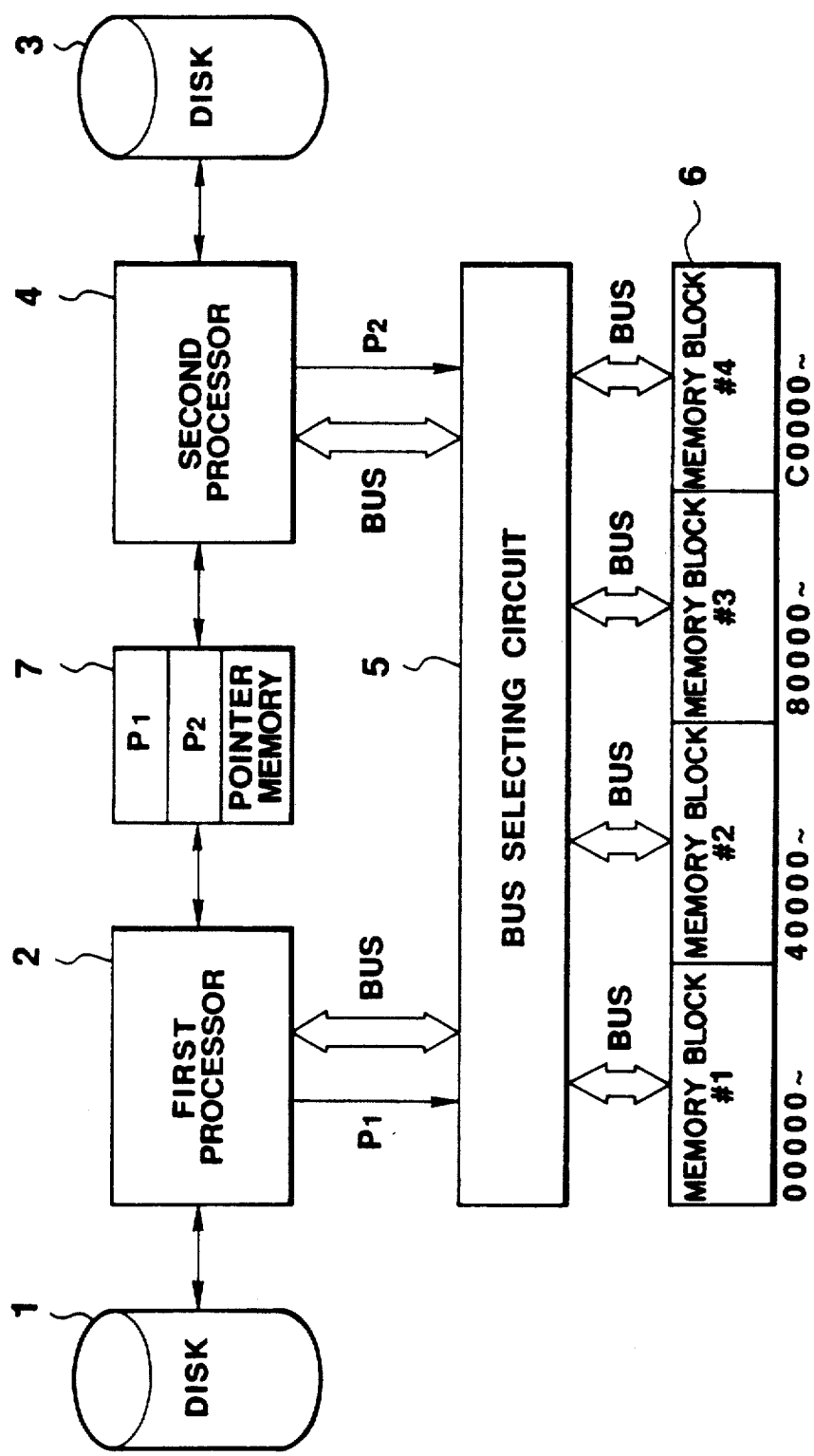
FIG. 1 is a block diagram of a memory control system.

FIG. 1 is a block diagram illustrating the arrangement of a memory control system embodying the present invention.

This memory control system has a first processor 2 connected to a magnetic disk 1 for storing a transaction file or the like and a second processor 4 connected to a magnetic disk 3 for storing a master file or the like. Both apparatuses 2 and 4 are connected via a bus selecting circuit 5 to a RAM 6 including a plurality of memory blocks. These apparatuses 2 and 4 are also commonly connected to a pointer memory 7 that stores various types of pointers. The first processor 2 is capable of accessing one memory block in the RAM 6, which is specified by the first pointer $P_1$ of the pointer memory 7, to update data in the associated memory block based on data of the transaction file stored on the disk 1. The second processor 4 is capable of accessing one memory block in the RAM 6, which is specified by the second pointer $P_2$ of the pointer memory 7, to read out data from that memory block and transfer it to the disk 3. As is apparent from FIG. 1, the RAM 6 includes four memory blocks #1, #2, #3 and #4, with a bus line (including a control bus line and data bus line) connected to each block, so that these memory blocks are separately accessible. In other words, the addresses of the individual memory blocks, which can serve as independent memories, are contiguous and their address regions have address "00000-3FFFF," "40000-7FFFF," "80000-BFFFF" and "C0000-FFFFF" in order from the first memory block #1. It is therefore possible to store in each memory block data contiguous over a plurality of memory blocks, permitting the whole memory blocks to be treated as if it were a single memory.

When the first processor 2 specifies a memory block corresponding to the first pointer $P_1$, the bus switching circuit 5 connects the bus line of the specified memory block to the bus line of the first processor 2. When the second processor 4 specifies a memory block corresponding to the second pointer $P_2$, the bus switching circuit 5 connects the bus line of this specified memory block to the bus line of the second processor 4.

Figure 2:
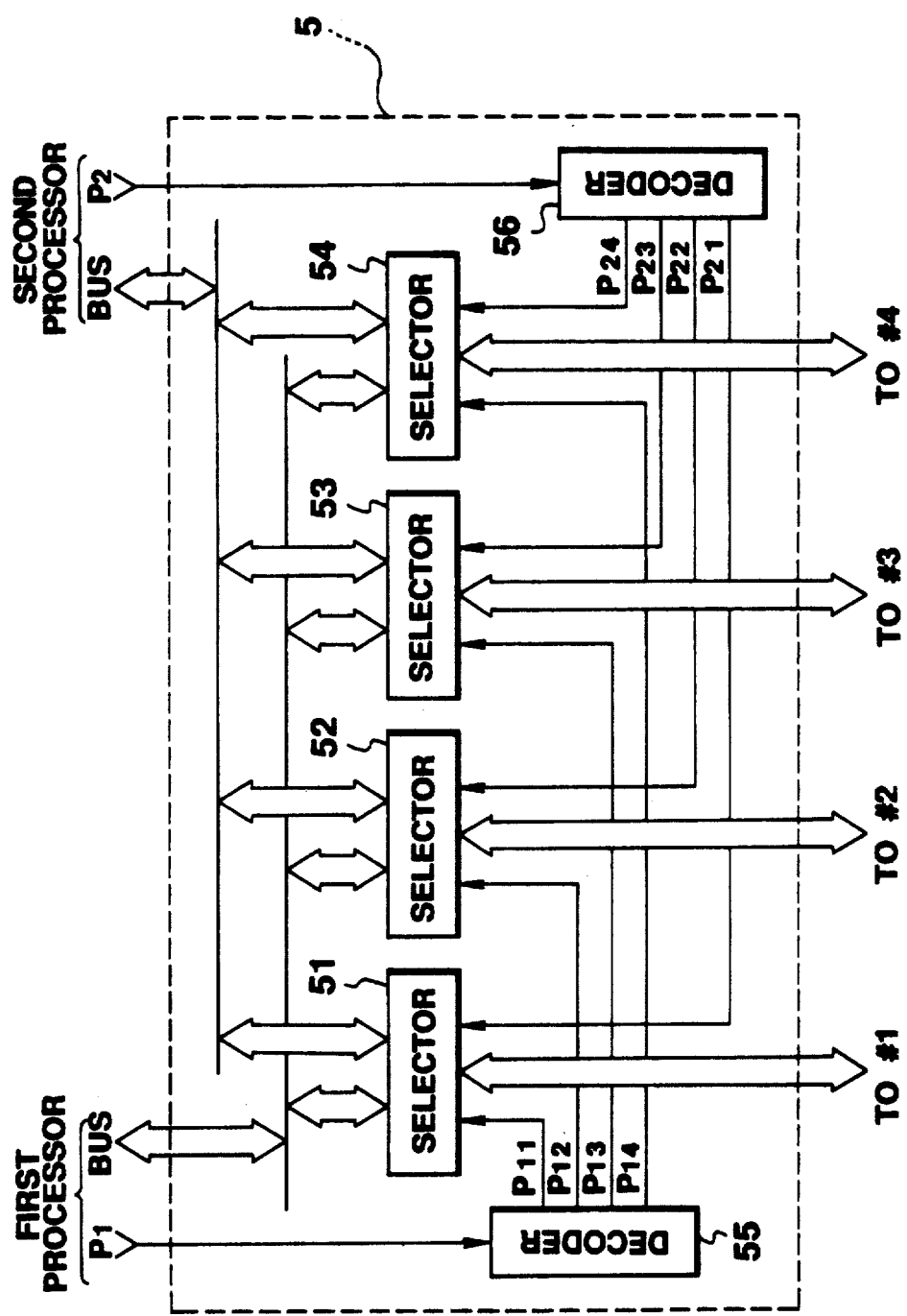
FIG. 2 is a detailed block diagram of a bus switching circuit.

FIG. 2 is a detailed block diagram of the bus switching circuit 5.

The bus lines from the individual memory blocks #1 to #4 are connected to one side of the selectors 51 to 54 provided in association with these memory blocks. The bus lines from the first processor 2 and the second processor 4 are selectably connected to selectors 51 to 54 on the other side. A memory block designating signal $P_1$ from the first processor 2 is input to a decoder 55 which in turn decodes its value to output one of acknowledge signals $P_{11}$ to $P_{14}$. A memory block designating signal $P_2$ from the second processor 4 is input to a decoder 56 which in turn decodes its value to output one of acknowledge signals $P_{21}$ to $P_{24}$. Upon reception of the acknowledge signal $P_{11}$ from the decoder 55, the selector 51 connects the bus line from the memory block #1 to the bus line from the first processor 2 to allow the first processor 2 to access this memory block #1. Upon reception of the acknowledge signal $P_{21}$ from the decoder 56, the selector 51 connects the bus line from the memory block #1 to the bus line from the second processor 4 to allow memory access to this memory block #1 from the second processor 4. The other selectors 52-54 function in exactly the same manner as the selector 51.

One example of the operation of the memory control system will be described below. In this example, the content of the master file stored over the individual memory blocks in the RAM 6 is updated by the transaction file on the disk 1 connected to the first processor 2, and the updated content of the master file is transferred for storage onto the disk 3 connected to the second processor 4.

Figure 3:
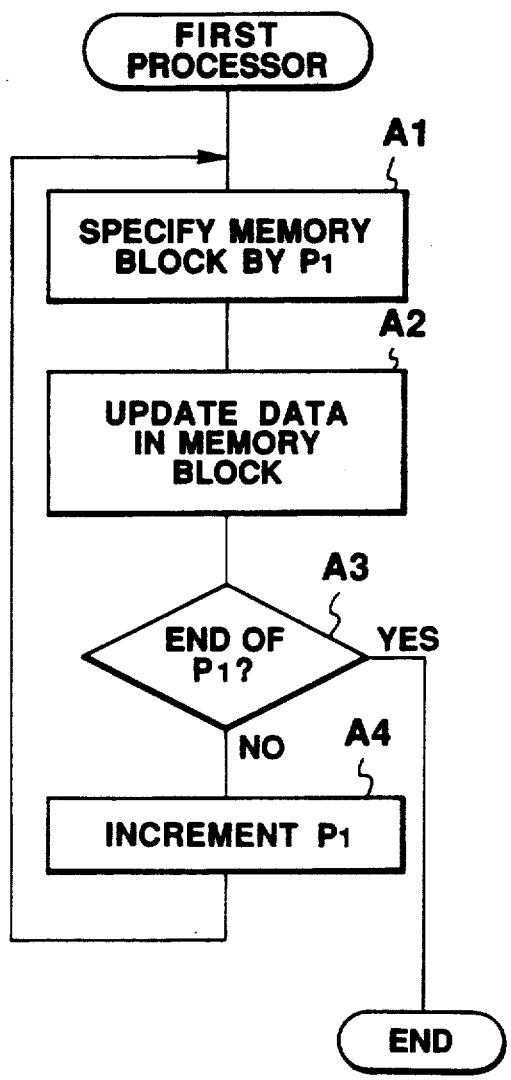
FIG. 3 is a flowchart illustrating the processing of a first processor.

FIG. 3 is a flowchart illustrating the processing performed by the first processor 2 in the above operation.

Provided that "1" is set as the initial values of the first pointer $P_1$ and second pointer $P_2$ in the pointer memory 7, the first processor 2 starts the processing according to the flowchart shown in FIG. 3. First, the first processor 2 specifies a memory block corresponding to the first pointer $P_1$ (step A1). That is, the first processor 2 reads out the value of the first pointer $P_1$ from the pointer memory 7 and sends the value to the decoder 55 of the bus switching circuit 5. The decoder 55 in turn decodes the value of the first pointer $P_1$, "1" in this case, and sends the acknowledge signal $P_{11}$ to the selector 51. As a result, the selector 51 connects the bus line from the memory block #1 to the bus line from the first processor 2. The flow then advances to step A2 where every data in the specified memory block is updated. In other words, the first processor 2 accesses the memory block #1 to sequentially read out data therefrom, updates the data based on data in the transaction file on the disk 1, and writes the updated data again into the memory block #1. When updating of every data in the specified memory block is completed in this manner, the flow advances to step A3 where it is determined whether or not the first pointer $P_1$ is an end pointer, i.e., whether or not the value of the pointer $P_1$ is "4" indicating the last memory block #4. If the determination is negative (NO), the flow advances to step A4 where the first pointer $P_1$ is incremented or $(P_1+1 \rightarrow P_1)$ is computed and the incremented first pointer $P_1$ is written in the pointer memory 7. After the step A4, the flow returns to step A1. In this case, the first pointer $P_1$ is incremented to "2" in step A4 and the second memory block #2 is specified in step A1. The same routines are repeated thereafter and the entire processing is terminated when it is determined in step A3 that the first pointer $P_1$ specifies the last memory block #4.

In other words, the first processor 2 sequentially accesses the memory blocks from #1 to #4 and updates data using the transaction file stored on the disk 1.

Figure 4:
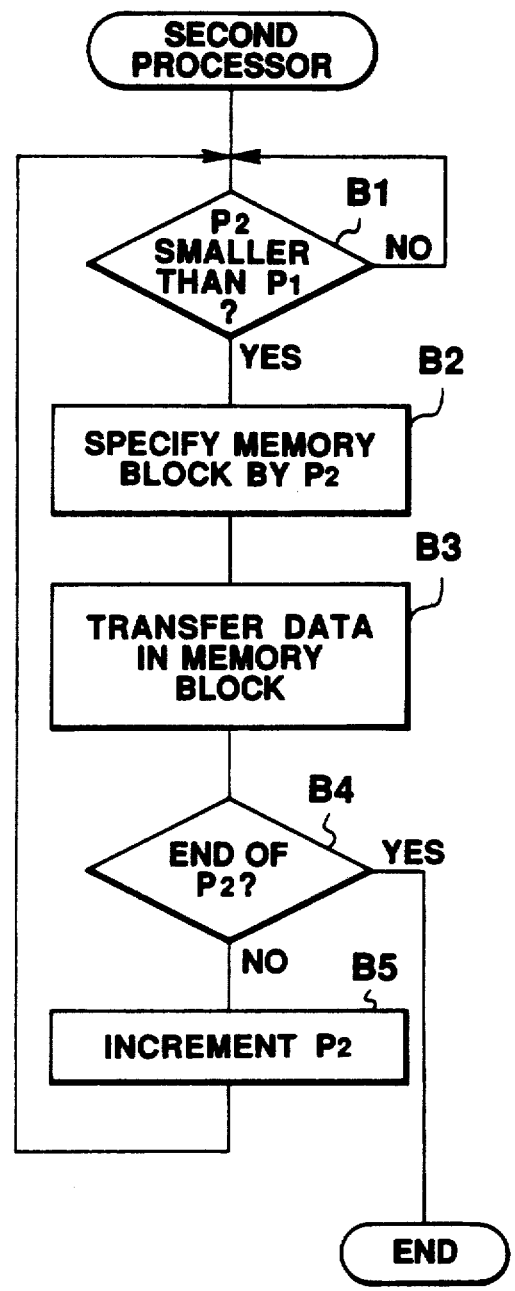
FIG. 4 is a flowchart illustrating the processing of a second processor.

FIG. 4 is a flowchart illustrating the processing of the second processor 4. First, it is determined in step B1 whether or not the second pointer $P_2$ in the pointer memory 7 is smaller than the first pointer $P_1$. This step B1 is repeated until the second pointer $P_2$ becomes smaller than the first pointer $P_1$ or until the first processor 2 updates the data in the specified memory block, incrementing the first pointer $P_1$. When the second pointer $P_2$ is determined to be smaller than the first pointer $P_1$, the flow advances to step B2 where a memory block corresponding to the second pointer $P_2$ is specified. That is, the second processor 4 reads out the value of the second pointer $P_2$ from the pointer memory 7 and sends the value to the decoder 56 of the bus switching circuit 5. The decoder 56 in turn decodes the value of the second pointer $P_2$, "1" in this case, and sends the acknowledge signal $P_{21}$ to the selector 51. As a result, the selector 51 connects the bus line from the memory block #1 to the bus line from the second processor 4. The flow then advances to step B3 where the second processor 2 accesses the specified memory block, sequentially reads out all the pieces of data in this memory block and transfers them to the disk 3. When transfer of every data in the specified memory block is completed in this manner, the flow advances to step B4 where it is determined whether or not the second pointer $P_2$ is an end pointer, i.e., whether or not the value of the pointer $P_2$ is "4" indicating the last memory block #4. If the determination is negative (NO), the flow advances to step B5 where the second pointer $P_2$ is incremented.

More specifically, at the time of specifying a memory block, the second processor 4 checks if data updating to this memory block has been performed by the first processor 2, and, if the determination is affirmative, sequentially accesses the updated memory block and transfers the content to the disk 3.

As described above, at the time the first processor 2 updates the data in the RAM 6 and the second processor 4 transfers the updated data, the first processor 2 and second processor 4 can separately access each memory block. Even before the first processor 2 has not completed updating every data in the RAM 6, if there is any memory block in the RAM 6 whose data updating has already been completed, the second processor 4 can access this memory block. In other words, the first processor 2 and second processor 4 can execute simultaneous or parallel processing, resulting in high speed processing.

Figure 5:
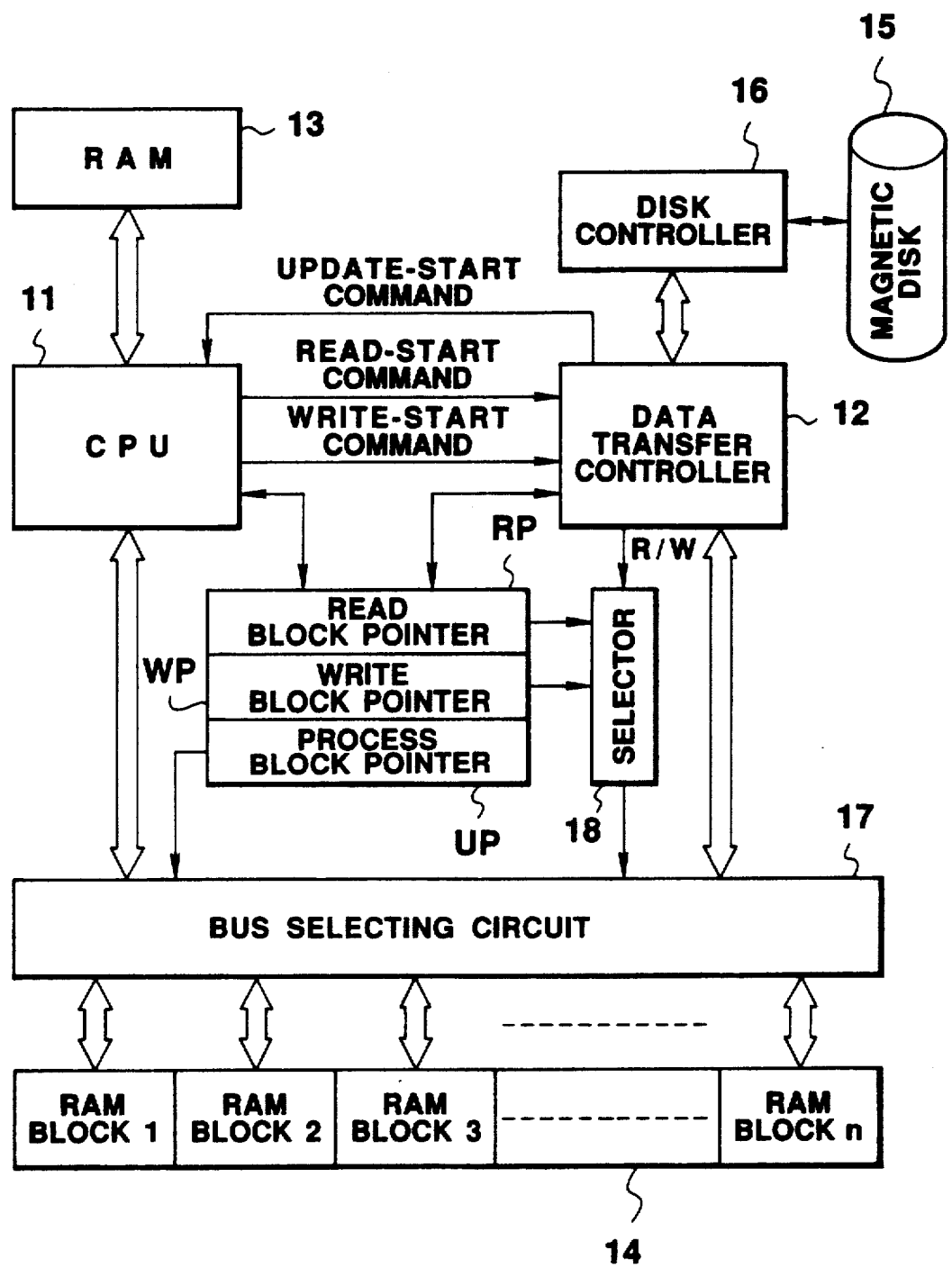
FIG. 5 is a block structural diagram of a data updating apparatus to which the present invention is applied.
Figure 8:
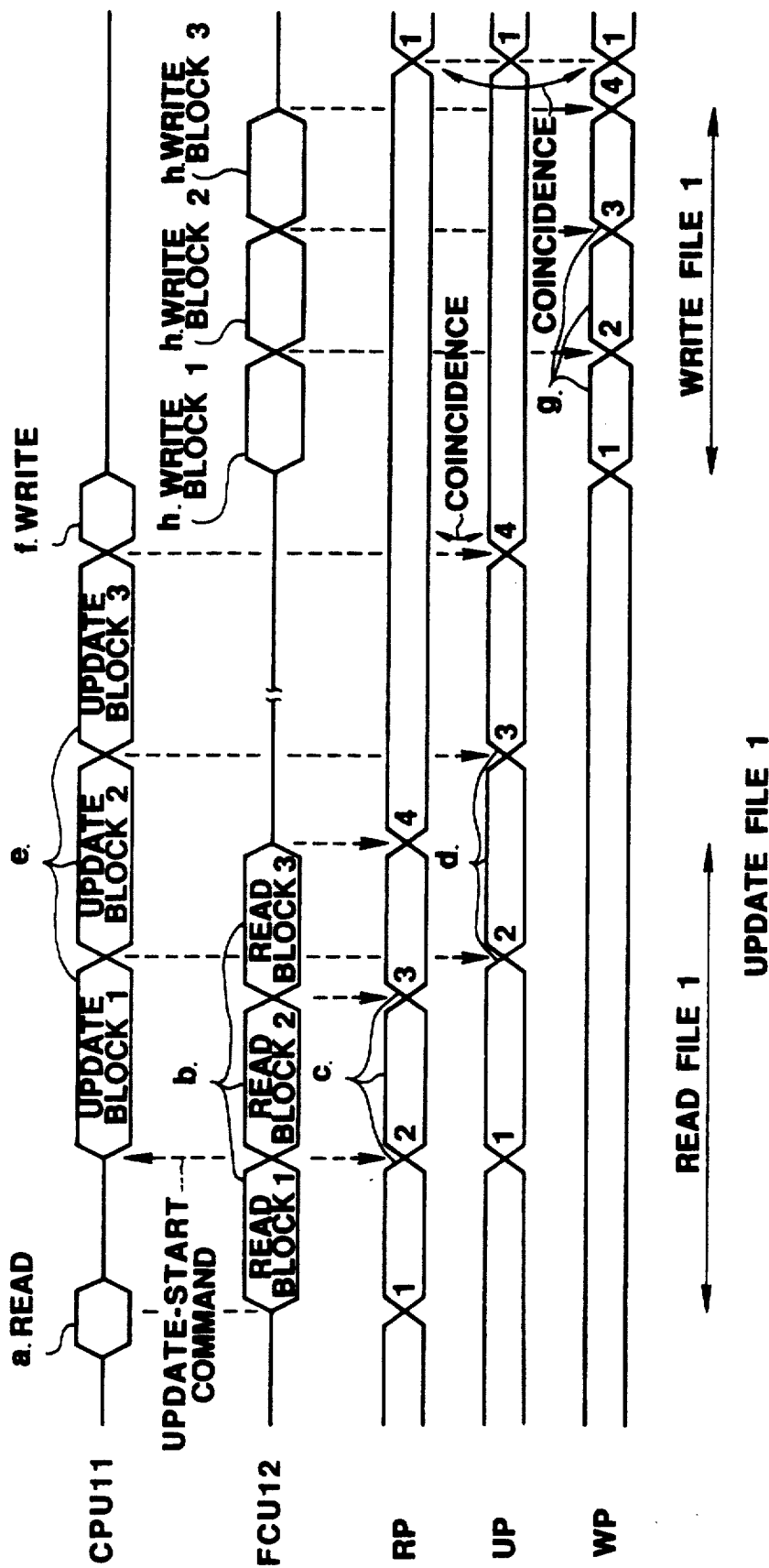
FIG. 8 is a timing chart for explaining process timings.
Figure 9:
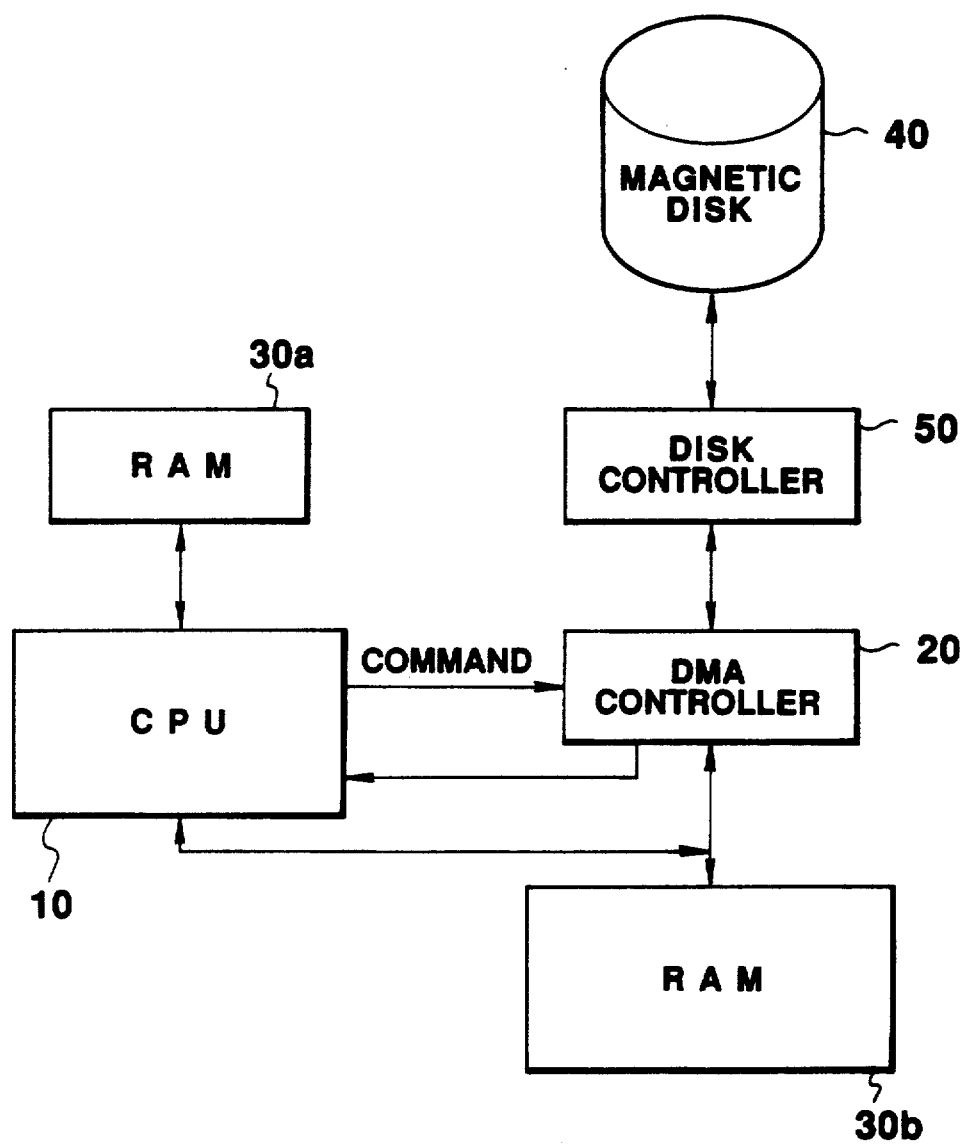
FIG. 9 is a diagram for explaining the prior art.

Referring to FIGS. 5 and 8, a description will now be given of the second embodiment of the present invention which is a data updating apparatus to which the memory control system of the present invention is applied.

FIG. 5 presents a block structural diagram of the data updating apparatus which comprises a CPU 11, a data transfer controller 12, RAMs 13 and 14, a magnetic disk 15, a disk controller 16, a read block pointer RP, a write block pointer WP, a process block pointer UP, and a selector 18.

The CPU 11 controls processing, such as registering of, for example, daily total data developed in the RAM 13 into a total file, and adding the daily total data in the total file to previous total data in a monthly total file which is developed in the RAM 14.

The data transfer controller 12 transfers data between the magnetic disk 15 and the RAM 14 in response to a command from the CPU 11. In this case, the data transfer controller 12 transfers data to the RAM 14 from the magnetic disk 15 upon reception of a read command from the CPU 11, and transfers data to the magnetic disk 15 from the RAM 14 upon reception of a write command. This data transfer is executed block by block as will be described later. The data transfer controller 12 only controls data transfer, and it is the disk controller 16 that accesses the magnetic disk 15.

The RAM 14 is divided into a plurality of memory blocks, which can individually be accessed through bus switching conducted by a bus switching circuit 17. When the data transfer controller 12 reads out data, block by block, from the magnetic disk 15, the bus switching circuit 17 switches the buses, so that the CPU 11 can access the block to which data reading has already been completed. The CPU 11 executes a data updating process on the data in this accessible memory block. Even during the data updating, the data transfer controller 12 keeps reading data into the remaining blocks.

The read block pointer RP, the write block pointer WP, and the process block pointer UP are utilized for such a control. The selector 18 selects either the read block pointer RP or the write block pointer WP and outputs it to the bus switching circuit 17. As the bus switching circuit 17 has the same structure as the bus switching circuit 5 in FIG. 2, its description will be omitted.

Figure 6:
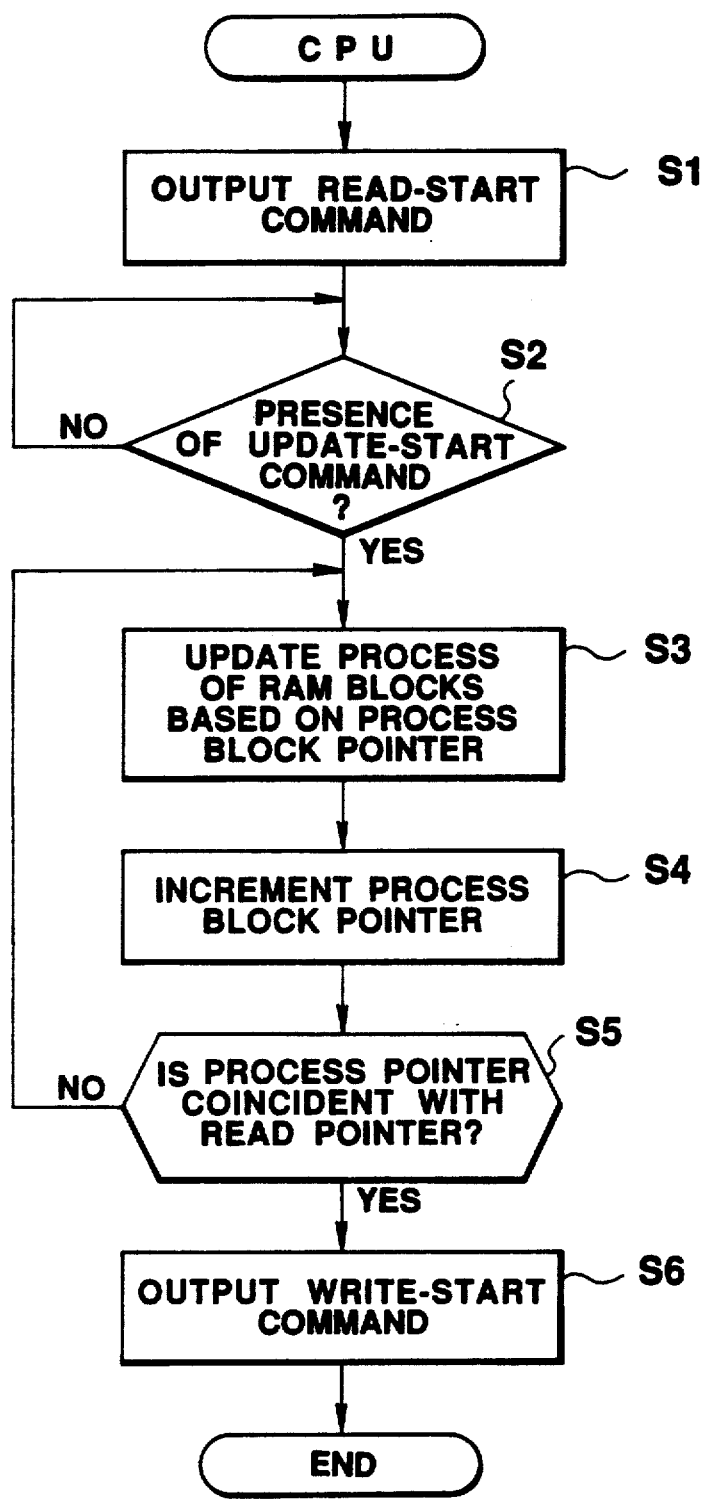
FIG. 6 is a flowchart illustrating the processing of a CPU.

The operation of this embodiment will be described referring to FIGS. 6 and 8. As the operation of the CPU 11 in FIG. 6 and that of the data transfer controller 12 in FIG. 7 affect each other so that these operations would be difficult to understand without clear comprehension of the mutual operational relation or influence. To help understand the operations easier, the mutual operational relation will be described after explaining the operations along the flowcharts in FIGS. 6 and 7.

The CPU 11 sets an initial value "1" to the process block pointer UP, and sends a read-start command to the data transfer controller 12 (step S1). The CPU 11 then waits for an update-start command from the data transfer controller 12 (step S2). Upon reception of the update-start command from the data transfer controller 12, the CPU 11 performs predetermined update processing on data in that block in the RAM 14 which has the block number specified by the process block pointer UP (step S3).

Then the content of the process block pointer UP is incremented by "1" (step S4), and it is determined whether or not the content of the process block pointer UP coincides with the content of the read block pointer RP (step S5).

If those contents do not coincide with each other, there still exists, among those accessed for data reading, a block which has not yet undergone data updating, as will be apparent from a later description. The flow therefore returns to step S3, continuing data updating for the blocks accessed for data read-in.

If the contents coincide with each other, however, which means completion of the data updating for those blocks which have already accessed for data read-in, as will be described later, the CPU 11 sends a write-start command to the data transfer controller 12 (step S6), terminating the whole operation.

The operation of the data transfer controller 12 will now be described.

The data transfer controller 12 sets an initial value "1" to the read block pointer RP and the write block pointer WP, and waits for a read-start command from the CPU 11 (step S51). Upon reception of the read-start command from the CPU 11, the data transfer controller 12 reads data to be updated from the magnetic disk 15 into that block in the RAM 14 which is specified by the read block pointer RP (step S52). After accessing for data read-in for one block, the content of the read block pointer UP is incremented by "1" (step S53), and an update-start command is sent to the CPU 11 (step S54).

Then, it is determined whether or not data to be updated, which should be read in, is present on the magnetic disk 15 (step S55).

If there remains such data, the data transfer controller 12 reads data to be updated from the magnetic disk 15 into a block indicated by the read block pointer RP (step S56). After reading data for one block, the content of the read block pointer RP is incremented by "1" (step S57), and the flow returns to step S55.

If it is determined in step S55 that no further to-be-updated data, which should be read in, remains on the magnetic disk 15, or when the to-be-updated data is read in, the data transfer controller 12 waits for a write-start command from the CPU (step S58).

On receiving the write-start command, the data transfer controller 12 transfers data in a block indicated by the write block pointer WP, or the data for one block updated by the CPU 11, to the magnetic disk 15 (step S59). After the transfer of the data for one block, the content of the write block pointer WP is incremented by "1" (step S60).

Then it is determined whether or not the contents of the write block pointer WP and the read block pointer RP coincide with each other (step S61).

If those contents do not coincide with each other, there still exists, among those accessed for data updated, a block which has not yet undergone data transferred to the magnetic disk 15, as will be apparent from a later description. The flow therefore returns to step S59, continuing data transfer for the blocks accessed for data updated.

If the contents coincide with each other, however, which means completion of the data transfer for those blocks which have already accessed for data updated, as will be described later, the data transfer controller 12 terminates the whole operation.

Figure 7:
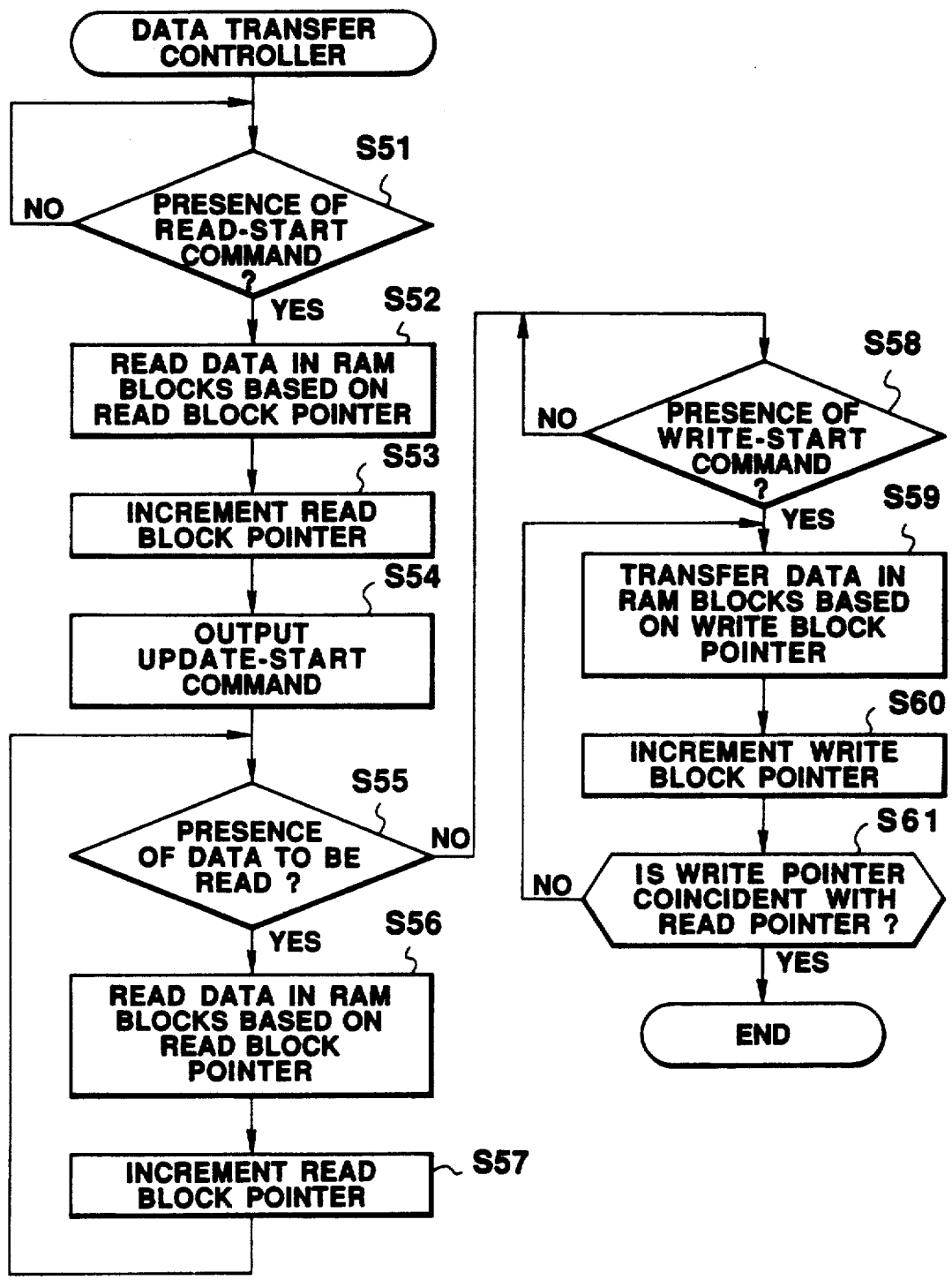
FIG. 7 is a flowchart illustrating the processing of a data transfer controller.

The routines shown in FIGS. 6 and 7 will now be described referring to FIG. 8.

First, the CPU 11 outputs a read-start command to the data transfer controller 12 (see "a" in FIG. 8). The data transfer controller 12 (simply referred to as FCU 12 in the diagram) in turn reads data into the block having the block number indicated by the read block pointer RP (see "b" and "c"). At this time, the data transfer controller 12 sends an update-start command to the CPU 11 upon completion of reading data into the first block.

Then, the CPU 11 executes data updating, such as adding data in the RAM 13 to that data read in the block which is specified by the process block pointer UP (see "d" and "e"). In other words, the reading of data in the specified block by the data transfer controller 12 and the data updating to this read data by the CPU 11 are executed in parallel, as should be apparent from the diagram. When the content of the process block pointer UP coincides with that of the read block pointer RP, the CPU 11 sends a write-start command to the data transfer controller 12 (see "f").

Upon reception of this write-start command, the data transfer controller 12 transfers updated data in the block specified by the write block pointer WP to the magnetic disk 15 (see "g" and "h"). When the content of the write block pointer WP coincides with that of the read block pointer RP, the data transfer controller 12 stops transferring the update data.

The data read-in process and the data updating on the read data are simultaneously executed in parallel in the above manner.

The data updating should not necessarily be performed from that block into which data has already been read; the data updating can be executed in any order as long as data reading in the target blocks has been completed.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. A memory control system with memory means including a plurality of memory blocks, each memory block being individually accessible, comprising:
   first and second processing means which are separately operable; and
   pointer memory means for storing a first pointer and a second pointer;
   said first processing means including first specifying means for specifying one of the memory blocks by the first pointer, first accessing means for accessing the specified memory block, first increasing means for increasing the first pointer, and first repeating means for causing said first specifying means, said first accessing means, and said first increasing means to respectively repeat said specifying, said accessing and said increasing; and
   said second processing means including comparing means for comparing the first pointer and the second pointer, second specifying means for specifying one of the memory blocks by the second pointer when the second pointer is smaller than the first pointer, second accessing means for accessing a memory block specified by said second pointer, second increasing means for increasing the second pointer, and second repeating means for causing said comparing means, said second specifying means, said second accessing means and said second increasing means to respectively repeat said comparing, said specifying, said accessing and said increasing.

2. The memory control system according to claim 1, wherein:
   said first repeating means includes means for repeating said specifying, said accessing and said increasing until there exists an absence of memory blocks to be accessed; and
   said second repeating means includes means for repeating said comparing, said specifying, said accessing and said increasing until the second pointer coincides with the first pointer.

3. The memory control system according to claim 1, wherein:
   said first specifying means includes first connecting means for connecting a bus line of one of the memory blocks specified by the first pointer to a bus line of said first processing means; and
   said second specifying means includes second connecting means for connecting a bus line of one of the memory blocks specified by the second pointer to a bus line of said second processing means.

4. A memory control system, comprising:
   external memory means for storing a plurality of data blocks;
   internal memory means including a plurality of memory blocks which are individually accessible block by block;
   pointer memory means for storing a first pointer, a second pointer, and a third pointer;
   data transfer control means; and
   data updating means;
   said data transfer control means including read out means for reading out one of the data blocks from the external memory means, storing means for storing said read out data block into a memory block which corresponds to the first pointer, first increasing means for increasing the first pointer when said storing is completed, and first repeating means for causing said readout means, said storing means and said first increasing means to repeat said reading out, said storing, and said increasing until there exists an absence of a data block to be read out;
   said data updating means including updating means for updating, when the second pointer is smaller than the first pointer, a data block stored, a memory block which corresponds to the second pointer, second increasing means for increasing, when said updating is completed, the second pointer, and second repeating means for causing said updating means and said second increasing means to repeat said updating and said increasing until the second pointer coincides with the first pointer; and
   said data transfer control means further including writing means for writing the updated data block, which is stored in a memory block corresponding to the third pointer, into the external memory means, third increasing means for increasing, when said writing is completed, the third pointer, and third repeating means for causing said writing means and said third increasing means to repeat said comparing and said increasing until the third pointer coincides with the first pointer.

* * * * *